US011990085B2

(12) United States Patent
Yuan et al.

(10) Patent No.: US 11,990,085 B2
(45) **Date of Patent: *May 21, 2024**

(54) DISPLAY PANEL AND DISPLAY DEVICE

(71) Applicant: Xiamen Tianma Micro-Electronics Co., Ltd., Xiamen (CN)

(72) Inventors: Yong Yuan, Shanghai (CN); Jieliang Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,375

(22) Filed: Nov. 21, 2022

(65) Prior Publication Data

US 2023/0086559 A1 Mar. 23, 2023

Related U.S. Application Data

(63) Continuation of application No. 17/409,339, filed on Aug. 23, 2021, now Pat. No. 11,538,402.

(30) Foreign Application Priority Data

Oct. 23, 2020 (CN) ......................... 202011149636.4

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0842* (2013.01); *G09G 2310/0278* (2013.01); *G09G 2310/062* (2013.01); *G09G 2310/08* (2013.01); *G09G 2320/045* (2013.01)

(58) Field of Classification Search
CPC ...... G09G 3/32–3291; G09G 2300/0421–043; G09G 2300/0809; G09G 2300/0819; G09G 2300/0842; G09G 2300/0852; G09G 2300/0861; G09G 2300/0866; G09G 2310/0264; G09G 2310/027; G09G 2310/0272; G09G 2310/0278; G09G 2310/0289; G09G 2310/06; G09G 2310/062; G09G 2310/067; G09G 2310/08; G09G 2320/0233;
(Continued)

(56) References Cited

U.S. PATENT DOCUMENTS

2008/0036704 A1 2/2008 Kim et al.
2016/0322449 A1* 11/2016 Pyon .................... G09G 3/3233
(Continued)

*Primary Examiner* — Nathan Danielsen
(74) *Attorney, Agent, or Firm* — Anova Law Group, PLLC

(57) ABSTRACT

A display panel includes a pixel circuit and a light-emitting element. The pixel circuit includes a driving module, a data-writing module, and a compensation module, and a reset module. The driving module includes a driving transistor. The data-writing module is connected to a source of the driving transistor and configured to selectively provide a data signal for the driving transistor. The compensation module is connected between a gate and a drain of the driving transistor. The reset module is connected between the drain of the driving transistor and a reset signal terminal and configured to provide a reset signal for the gate of the driving transistor. The reset module is used as a bias module. An operating process of the pixel circuit includes a reset stage and a bias stage.

13 Claims, 6 Drawing Sheets

(58) Field of Classification Search
CPC ..... G09G 2320/029; G09G 2320/0295; G09G 2320/043; G09G 2320/045
See application file for complete search history.

(56) References Cited

U.S. PATENT DOCUMENTS

| | | | |
|---|---|---|---|
| 2017/0345367 | A1 | 11/2017 | Ka et al. |
| 2018/0275795 | A1 | 9/2018 | Takahashi |
| 2019/0252479 | A1 | 8/2019 | Kang et al. |
| 2020/0226978 | A1 | 7/2020 | Lin et al. |
| 2021/0118368 | A1 | 4/2021 | In et al. |

* cited by examiner

DISPLAY PANEL AND DISPLAY DEVICE

CROSS-REFERENCE TO RELATED APPLICATION

This application is a continuation of application Ser. No. 17/409,339, filed on Aug. 23, 2021, which claims the priority of Chinese patent application No. 202011149636.4, filed on Oct. 23, 2020, the entirety of which is incorporated herein by reference.

FIELD

The present disclosure generally relates to the field of display technology and, more particularly, relates to a display panel and a display device.

BACKGROUND

In a display panel, a pixel circuit provides a display-required driving current for the light-emitting element of the display panel, and controls whether the light-emitting element enters a light-emitting stage, which is an indispensable element in most self-luminous display panel.

However, in an existing display panel, as usage time increases, the internal characteristics of the driving transistor in the pixel circuit gradually change, causing a drift of the threshold voltage of the driving transistor. Alternatively, due to being affected by the operating process of the pixel circuit, a gate potential of the driving transistor in the pixel circuit is likely to be instable. The above-mentioned problems will affect the overall characteristics of the driving transistor, thereby affecting the display uniformity. The disclosed display panel and display device are directed to solve one or more problems set forth above and other problems.

SUMMARY

One aspect of the present disclosure provides a display panel. The display panel includes a pixel circuit and a light-emitting element. The pixel circuit includes a driving module, a data-writing module, and a compensation module, and a reset module. The driving module includes a driving transistor. The data-writing module is connected to a source of the driving transistor and configured to selectively provide a data signal for the driving transistor. The compensation module is connected between a gate and a drain of the driving transistor. The reset module is connected between the drain of the driving transistor and a reset signal terminal and configured to provide a reset signal for the gate of the driving transistor. The reset module is used as a bias module. An operating process of the pixel circuit includes a reset stage and a bias stage. In the reset stage, the compensation module and the reset module are turned on, and the reset signal terminal provides the reset signal to the gate of the driving transistor. In the bias stage, the compensation module is turned off, the reset module is turned on, and the reset signal terminal provides a bias signal to the drain of the driving transistor. The pixel circuit further includes a latch module and a reset signal line. The reset signal line is configured to provide the reset signal or the bias signal for the reset signal terminal. The latch module is connected between the gate of the driving transistor and the reset signal line.

Another aspect of the present disclosure provides a display device. The display device includes a display panel. The display panel includes a pixel circuit and a light-emitting element. The pixel circuit includes a driving module, a data-writing module, and a compensation module, and a reset module. The driving module includes a driving transistor. The data-writing module is connected to a source of the driving transistor and configured to selectively provide a data signal for the driving transistor. The compensation module is connected between a gate and a drain of the driving transistor. The reset module is connected between the drain of the driving transistor and a reset signal terminal and configured to provide a reset signal for the gate of the driving transistor. The reset module is used as a bias module. An operating process of the pixel circuit includes a reset stage and a bias stage. In the reset stage, the compensation module and the reset module are turned on, and the reset signal terminal provides the reset signal to the gate of the driving transistor. In the bias stage, the compensation module is turned off, the reset module is turned on, and the reset signal terminal provides a bias signal to the drain of the driving transistor. The pixel circuit further includes a latch module and a reset signal line. The reset signal line is configured to provide the reset signal or the bias signal for the reset signal terminal. The latch module is connected between the gate of the driving transistor and the reset signal line.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
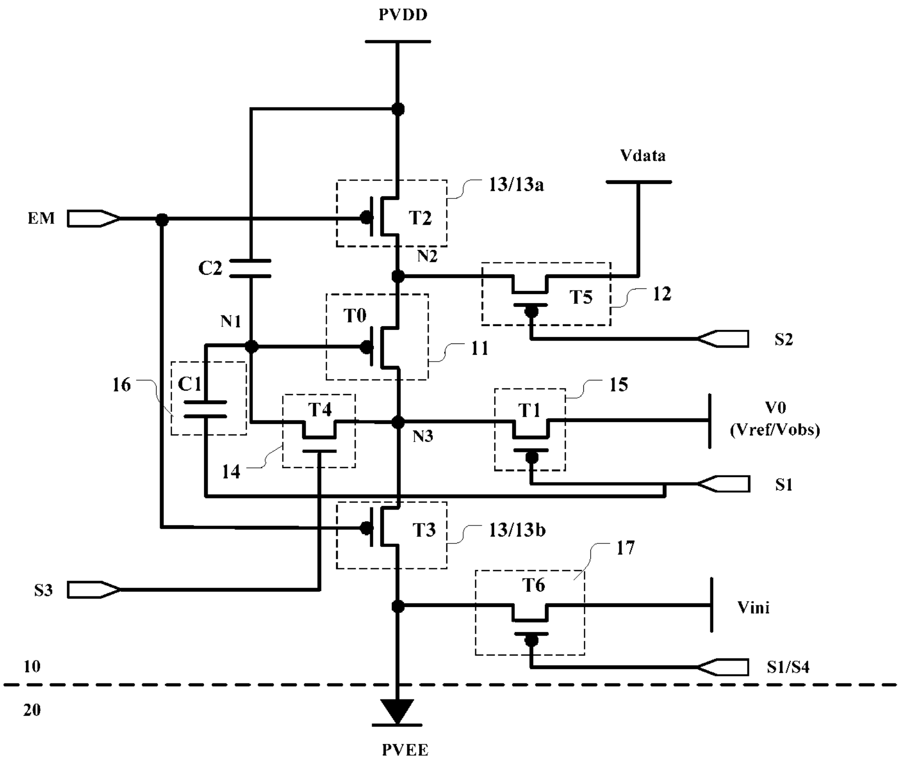
FIG. 1 illustrates a schematic diagram of a pixel circuit of an exemplary display panel consistent with disclosed embodiments of the present disclosure.

FIG. 1 illustrates a schematic diagram of a pixel circuit of a display panel consistent with disclosed embodiments of the present disclosure. Referring to FIG. 1, the display panel may include a pixel circuit 10 and a light-emitting element 20. The pixel circuit 10 may include a driving module 11, a data-writing module 12, and a light-emitting controller 13. The driving module 11 may be configured to provide a driving current for the light-emitting element 20, and the driving module 11 may include a driving transistor T0. The data-writing module 12 may be configured to selectively provide a data signal Vdata for the driving transistor T0. The light-emitting controller 13 may be configured to selectively allow the light-emitting element to enter a light-emitting stage. One end of the light-emitting controller 13 may be connected to a first power signal terminal for receiving a first power signal PVDD. Further, the pixel circuit 10 may include a latch module 16 and a first scanning signal line. The first scanning signal line may be configured to receive the first scanning signal S1. The latch module 16 may be connected between the gate of the driving transistor T0 and the first scanning signal line, and may be configured to adjust the gate potential of the driving transistor T0 according to the first scanning signal S1.

Optionally, in one embodiment, an input terminal of the driving module 11 may be connected to a source of the driving transistor T0, and an output terminal of the driving module 11 may be connected to a drain of the driving transistor T0. Optionally, in the pixel circuit illustrated in FIG. 1, the driving transistor T0 may be a PMOS transistor. Further, the driving transistor T0 may be a low-temperature polysilicon transistor.

Optionally, in one embodiment, a control terminal of the data-writing module 12 may be connected to the second scanning signal line for receiving a second scanning signal S2. The second scanning signal S2 may control the turn-on and turn-off of the data-writing module 12. A first end of the data-writing module 12 may be connected to a data signal input terminal for receiving the data signal Vdata, and a second end of the data-writing module 12 may be connected to the input terminal of the driving module 11. Optionally, the data-writing module 12 may include a fifth transistor T5, a source of the fifth transistor T5 may be connected to the first end of the data-writing module 12, and the drain of the fifth transistor T5 may be connected to the second end of the data-writing module 12.

Optionally, in one embodiment, the light-emitting controller 13 may include a first light-emitting controller 13*a* and a second light-emitting controller 13*b*. A first end of the first light-emitting controller 13*a* may be connected to a first power signal terminal for receiving a first power signal PVDD, and a second end of the first light-emitting controller 13*a* may be connected to an input terminal of the driving module 11. A first end of the second light-emitting controller 13*b* may be connected to an output terminal of the driving module 11, and a second end thereof may be connected to the light-emitting element 20. The control terminals of the first light-emitting controller 13*a* and the second light-emitting controller 13*b* may be connected to a same light-emitting control signal line for receiving the light-emitting control signal EM. Referring to FIG. 1, in certain embodiments, the control terminals of the first light-emitting controller 13*a* and the second light-emitting controller 13*b* may be connected to different light-emitting control signal lines for receiving different light-emitting control signals.

Optionally, the first light-emitting controller 13*a* may include a second transistor T2. A source of the second transistor T2 may be connected to the first end of the first light-emitting controller 13*a*, and a drain thereof may be connected to the second end of the first light-emitting controller 13*a*. The second light-emitting controller 13*b* may include a third transistor T3. A source of the third transistor T3 may be connected to the first end of the second light-emitting controller 13*b*, and a drain thereof may be connected to the second end of the second light-emitting controller 13*b*.

Figure 2:
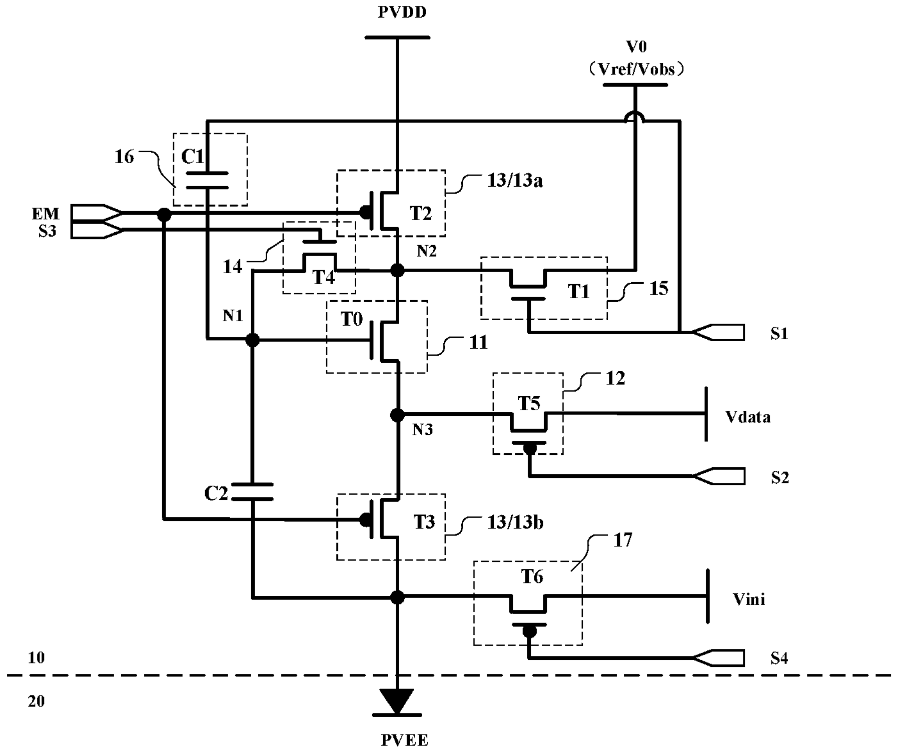
FIG. 2 illustrates a schematic diagram of a pixel circuit of another exemplary display panel consistent with disclosed embodiments of the present disclosure.

FIG. 2 illustrates a schematic diagram of a pixel circuit of another display panel consistent with disclosed embodiments of the present disclosure. Referring to FIG. 2, the display panel may include a pixel circuit 10 and a light-emitting element 20. The pixel circuit 10 may include a driving module 11, a data-writing module 12, and a light-emitting controller 13. The driving module 11 may be configured to provide a driving current for the light-emitting element 20, and the driving module 11 may include a driving transistor T0. The data-writing module 12 may be configured to selectively provide data signal Vdata for the driving transistor T0. The light-emitting controller 13 may be configured to selectively allow the light-emitting element to enter a light-emitting stage. One end of the light-emitting controller 13 may be connected to a first power signal terminal for receiving a first power signal PVDD. The pixel circuit 10 may further include a latch module 16 and a first scanning signal line. The first scanning signal line may be configured to receive a first scanning signal S1. The latch module 16 may be connected between a gate of the driving transistor T0 and the first scanning signal line, and may be configured to adjust the gate potential of the driving transistor T0 according to the first scanning signal S1.

Optionally, in one embodiment, an input terminal of the driving module 11 may be connected to a source of the driving transistor T0, and an output terminal of the driving module 11 may be connected to a drain of the driving transistor T0. Optionally, in the pixel circuit illustrated in FIG. 1, the driving transistor T0 may be an NMOS transistor. Further, the driving transistor T0 may be an oxide semiconductor transistor.

Optionally, in one embodiment, the control terminal of the data-writing module 12 may be connected to the second scanning signal line for receiving the second scanning signal S2, and the second scanning signal S2 may control the turn-on and turn-off of the data-writing module 12. The first end of the data-writing module 12 may be connected to the data signal input terminal for receiving the data signal Vdata, and the second end of the data-writing module 12 may be connected to the input terminal of the driving module 11. Optionally, the data-writing module 12 may include a fifth transistor T5. The source of the fifth transistor T5 may be connected to the first end of the data-writing module 12, and the drain of the fifth transistor T5 may be connected to the second end of the data-writing module 12.

Optionally, in one embodiment, the light-emitting controller 13 may include a first light-emitting controller 13*a* and a second light-emitting controller 13*b*. The first end of the first light-emitting controller 13*a* may be connected to the first power signal terminal for receiving the first power signal PVDD, and the second end of the first light-emitting controller 13*a* may be connected to an output terminal of the driving module 11. The first end of the second light-emitting controller 13*b* may be connected to an input terminal of the driving module 11, and the second end thereof may be connected to the light-emitting element 20. Referring to FIG. 2, the control terminals of the first light-emitting controller 13*a* and the second light-emitting controller 13*b* may be connected to a same light-emitting control signal line for receiving the light-emitting control signal EM. In certain embodiments, the control terminals of the first light-emitting controller 13*a* and the second light-emitting controller 13*b* may be connected to different light-emitting control signal lines for receiving different light-emitting control signals.

Optionally, the first light-emitting controller 13*a* may include a second transistor T2. The source of the second transistor T2 may be connected to the first end of the first light-emitting controller 13*a*, and the drain thereof may be connected to the second end of the first light-emitting controller 13*a*. The second light-emitting controller 13*b* may include a third transistor T3. The source of the third transistor T3 may be connected to the first end of the second light-emitting controller 13*b*, and the drain thereof may be connected to the second end of the second light-emitting controller 13*b*.

In the present disclosure, the latch module may be configured to be connected between the gate of the driving transistor and the first scanning line, such that the gate potential of the driving transistor may be adjusted by the first scanning signal. The gate potential of the driving transistor may determine the normal operation of the pixel circuit. At different stages, the gate potential of the driving transistor may tend to change, therefore, the gate potential of the driving transistor may be effectively maintained and controlled according to the first scanning signal and the latch module.

Optionally, in one embodiment, referring to FIG. 1, the pixel circuit 10 may include a reset module 15 and a compensation module 14. The reset module 15 may be connected between the reset signal terminal and the drain of the driving transistor T0 for providing a reset signal for the gate of the driving transistor T0. The reset module may include the first transistor T1. The compensation module 14 may be connected between the gate and the drain of the driving transistor T0 for compensating a threshold voltage of the driving transistor T0. The pixel circuit 10 may further include an initialization module 17. The initialization module 17 may be connected between an initialization signal terminal and the light-emitting element 20 for selectively providing an initialization signal Vini for the light-emitting element 20.

Optionally, the source of the first transistor T1 may be connected to the reset signal terminal, and the drain thereof may be connected to the drain of the driving transistor T0.

Optionally, the control terminal of the compensation module 14 may be connected to a third scanning signal line for receiving a third scanning signal S3. The third scanning signal S3 may control the turn-on and turn-off of the compensation module 14. The compensation module 14 may include a fourth transistor T4. The source of the fourth transistor T4 may be connected to the drain of the driving transistor T0, and the drain thereof may be connected to the gate of the driving transistor T0.

Optionally, the fourth transistor T4 may be a PMOS transistor or an NMOS transistor. When the fourth transistor T4 is a PMOS transistor and the third scanning signal S3 is a low-level signal, the fourth transistor T4 may be turned on, and the fourth transistor T4 may be a low-temperature polysilicon transistor. When the fourth transistor T4 is an NMOS transistor and the third scanning signal S3 is a high-level signal, the fourth transistor T4 may be turned on, and the fourth transistor T4 may be an oxide semiconductor transistor. For illustrative purposes, the fourth transistor T4 may be an NMOS oxide semiconductor transistor as an example.

Optionally, the initialization module may include a sixth transistor T6. The source of the sixth transistor T6 may be connected to the initialization signal terminal, and the drain thereof may be connected to the light-emitting element 20.

Referring to FIG. 2, the connection modes of the reset module 15 with the compensation module 14 and the initialization module 17 may be the same as the above-described connection modes, which may not be repeated herein. In FIG. 1 and FIG. 2, the source and drain of the driving transistor T0 may be interchanged, and an end of the driving transistor T0 connected to the data-writing module 11 may be the source of the driving transistor T0.

In certain embodiments, the control terminal of the reset module 15 may be connected to the first scanning signal line. In other words, when the first scanning signal S1 controls the reset module 15 to be turned on, under the action of the first scanning signal S1 and the latch module 16, the gate potential of the driving transistor T0 may be controlled to reach a first state. When the first scanning signal line S1 controls the reset module 15 to be turned off, under the action of the first scanning signal S1 and the latch module 16, the gate potential of the driving transistor T0 may be controlled to reach a second state. The first state and the second state may be a state where the potential is pulled up or a state where the potential is pulled down.

For example, when the first scanning signal S1 is a low-level signal and the reset module 15 is turned on, the first state may be a state where the potential is pulled down. When the first scanning signal S1 is a high-level signal and the reset module 15 is turned off, the second state may be a state where the potential is pulled up. For another example, when the first scanning signal S1 is a high-level signal and the reset module 15 is turned on, the first state may be a state where the potential is pulled up. When the first scanning signal S1 is a low-level signal and the reset module 15 is turned off, the second state may be a state where the potential is pulled down.

In certain embodiments, the control terminal of the initialization module 17 may be connected to the first scanning signal line. In other words, when the first scanning signal S1 controls the initialization module 17 to be turned on, under the action of the first scanning signal S1 and the latch module 16, the gate potential of the driving transistor T0 may be controlled to reach a third state. When the first scanning signal S1 controls the initialization module 17 to be turned off, under the action of the first scanning signal S1 and the latch module 16, the gate potential of the driving transistor T0 may be controlled to reach a fourth state. The third state and the fourth state may be a state where the potential is pulled up or a state where the potential is pulled down.

For example, when the first scanning signal S1 is a low-level signal and the initialization module 17 is turned on, the third state may be a state where the potential is pulled down. When the first scanning signal S1 is a high-level signal and the initialization module 17 is turned off, the fourth state may be a state where the potential is pulled up. For another example, when the first scanning signal S1 is a high-level signal and the initialization module 17 is turned on, the third state may be a state where the potential is pulled up. When the first scanning signal S1 is a low-level signal and the initialization module 17 is turned off, the fourth state may be a state where the potential is pulled down.

In certain embodiments, both the control terminal of the reset module 15 and the control terminal of the initialization module 17 may be configured to receive the first scanning signal S1. The latch module 16 may be connected to one of the first scanning signal line connected to the control terminal of the reset module 15 and the first scanning signal line connected to the control terminal of the initialization module 17. In one embodiment, both the reset module 15 and the initialization module 17 may receive the first scanning signal S1. When the transistors in both the reset module 15 and the initialization module 17 are PMOS transistors or NMOS transistors, the reset module 15 and the initialization module 17 may be simultaneously turned on or turned off, which may be allowed in the display panel. Because the reset stage and the initialization stage of the pixel circuit are independent of each other, the reset stage and the initialization stage may be performed at a same time or at a different time. In the present disclosure, the reset stage and the initialization stage may be performed at the same time, and may be controlled by a shared first scanning signal S1. Therefore, merely a set of shift register circuit for generating the first scanning signal S1 may need to be provided in the display panel to meet the requirements, thereby simplifying the structure and fabrication process of the display panel.

In one embodiment, optionally, the operating process of the pixel circuit may include a reset stage and a bias stage. In the reset stage, the reset module 15 and the compensation module 14 may be turned on. The reset signal terminal may provide a reset signal Vref for the gate of the driving transistor T0. In the bias stage, the reset module 15 may be turned on and the compensation module 14 may be turned off. The reset signal terminal may provide a bias signal Vobs for the drain of the driving transistor T0. In other words, the reset module 15 may be multiplexed as a bias module, and may be configured to provide a bias signal Vobs in the bias stage.

When the display panel is in a non-bias stage such as the light-emitting stage, the source of the driving transistor T0 may receive the first power signal PVDD, and the gate of the driving transistor T0 may be a signal written in the data-writing stage. Therefore, when the driving transistor is a PMOS transistor, in the light-emitting stage, the gate potential of the driving transistor T0 may be likely greater than the drain potential, the driving transistor may be turned on at this time, and such situation may be maintained for a long time, which may cause the Id-Vg curve of the driving transistor T0 to be deviated, and, thus, may cause an offset of the threshold voltage of the driving transistor T0.

When the driving transistor is an NMOS transistor, in the light-emitting stage, because the drain of the driving transistor T0 receives the first power signal PVDD, and the first power signal PVDD is often a high-level signal, the gate potential of the driving transistor TO may be likely less than the drain potential. In view of this, the driving transistor may be turned on, and such situation may be maintained for a long time, which may cause the Id-Vg curve of the driving transistor T0 to be deviated, and, thus, may cause an offset of the threshold voltage of the driving transistor T0.

Therefore, to improve such situation, the bias stage may need to be added. In the bias stage, the potential difference between the gate potential and the drain potential of the driving transistor T0 may be adjusted to reduce the offset of the threshold voltage of the driving transistor T0 caused by above-mentioned problems in the non-bias stage, ensuring the display uniformity.

In the reset stage, the gate of the driving transistor T0 may receive the reset signal, and the gate potential of the driving transistor T0 before the reset stage may be cleared, to reset the gate potential of the driving transistor T0 before proceeding next operation, and to prevent the residual gate potential from affecting the next operation. For example, before performing the data-writing stage, the reset stage may need to be performed to ensure that the signal written in the data-writing stage may not be interfered by any other signal.

Optionally, in one embodiment, both the driving transistor T0 and the first transistor T1 may be PMOS transistors. In the bias stage, the voltage of the first scanning signal S1 may be lower than the voltage of the bias signal Vobs. Alternatively, both the driving transistor T0 and the first transistor T1 may be NMOS transistors. In the bias stage, the voltage of the first scanning signal S1 may be greater than the voltage of the bias signal Vobs.

For illustrative purposes, the control terminal of the reset module 15 may be connected to the first scanning signal line as an example. Referring to FIG. 1, when both the driving transistor T0 and the first transistor T1 are PMOS transistors, in the bias stage, the first scanning signal S1 may be a low-level signal, and under the action of the first scanning signal S1, the reset module 15 may be turned on, and the bias signal Vobs may be written into the drain of the driving transistor T0. The bias stage may adjust the potential difference between the gate potential and the drain potential of the driving transistor in the non-bias stage, e.g., reducing the potential difference, or even reversing the potential difference. Therefore, the drain potential may need a substantially high potential, and the gate potential may need a substantially low potential. In the present disclosure, the bias signal Vobs may be a high-level signal, and the first scanning signal S1 may be a low-level signal. The bias signal Vobs may raise the drain potential of the driving transistor T0, and the first scanning signal S1 may pull down the gate potential of the driving transistor T0 under the action of the latch module 16, thereby achieving the dual adjustments of the gate potential and drain potential of the driving transistor T0, which may facilitate to improve the bias effect.

For illustrative purposes, the control terminal of the reset module 15 may be connected to the first scanning signal line as an example. Referring to FIG. 2, when both the driving transistor T0 and the first transistor T1 are NMOS transistors, in the bias stage, the first scanning signal S1 may be a high-level signal, and under the action of the first scanning signal S1, the reset module 15 may be turned on, and the bias signal Vobs may be written into the drain of the driving transistor T0. The bias stage may adjust the potential difference between the gate potential and the drain potential of the driving transistor in the non-bias stage, e.g., reducing the potential difference, or even reversing the potential difference. Therefore, the drain potential may need a substantially low potential, and the gate potential may need a substantially high potential. In the present disclosure, the bias signal Vobs may be a low-level signal, and the first scanning signal S1 may be a high-level signal. The bias signal Vobs may pull down the drain potential of the driving transistor T0, and the first scanning signal S1 may raise the gate potential of the driving transistor T0 under the action of the latch module 16, thereby achieving the dual adjustments of the gate potential and drain potential of the driving transistor T0, which may facilitate to improve the bias effect.

Optionally, in one embodiment, the driving transistor may be a PMOS transistor. In the bias stage, the drain voltage of the driving transistor T0 may be greater than the gate potential of the driving transistor T0. In another embodiment, the driving transistor may be an NMOS transistor. In the bias stage, the drain potential of the driving transistor T0 may be smaller than the gate potential of the driving transistor T0.

In the case where the driving transistor is a PMOS transistor, in the non-bias stage such as the light-emitting stage, when the driving transistor T0 is turned on, the gate potential of the driving transistor T0 may be greater than the drain potential thereof, which may cause an offset of the threshold value of the driving transistor T0. Therefore, in the bias stage, if the drain potential of the driving transistor is set to be greater than the gate potential thereof, the above-mentioned problems in the non-bias stage may be effectively cancelled out.

Similarly, in the case where the driving transistor is an NMOS transistor, in the non-bias stage such as the light-emitting stage, when the driving transistor T0 is turned on, the gate potential of the driving transistor T0 may be lower than the drain potential thereof, which may cause an offset of the threshold value of the driving transistor T0. Therefore, in the bias stage, if the drain potential of the driving transistor is set to be smaller than the gate potential thereof, the above-mentioned problems in the non-bias stage may be effectively cancelled out.

For illustrative purposes, the driving transistor shown in FIG. 1 may be a PMOS transistor as an example, to describe the operating timing diagram of the pixel circuit in the following embodiments. It should be noted that in any other embodiment, e.g., the driving transistor shown in FIG. 2 may be an NMOS transistor, the relationship between various stages in the pre-light-emitting stage may satisfy the various situations in the disclosed embodiments, and the same or similar parts may not be repeated herein.

Figure 3:
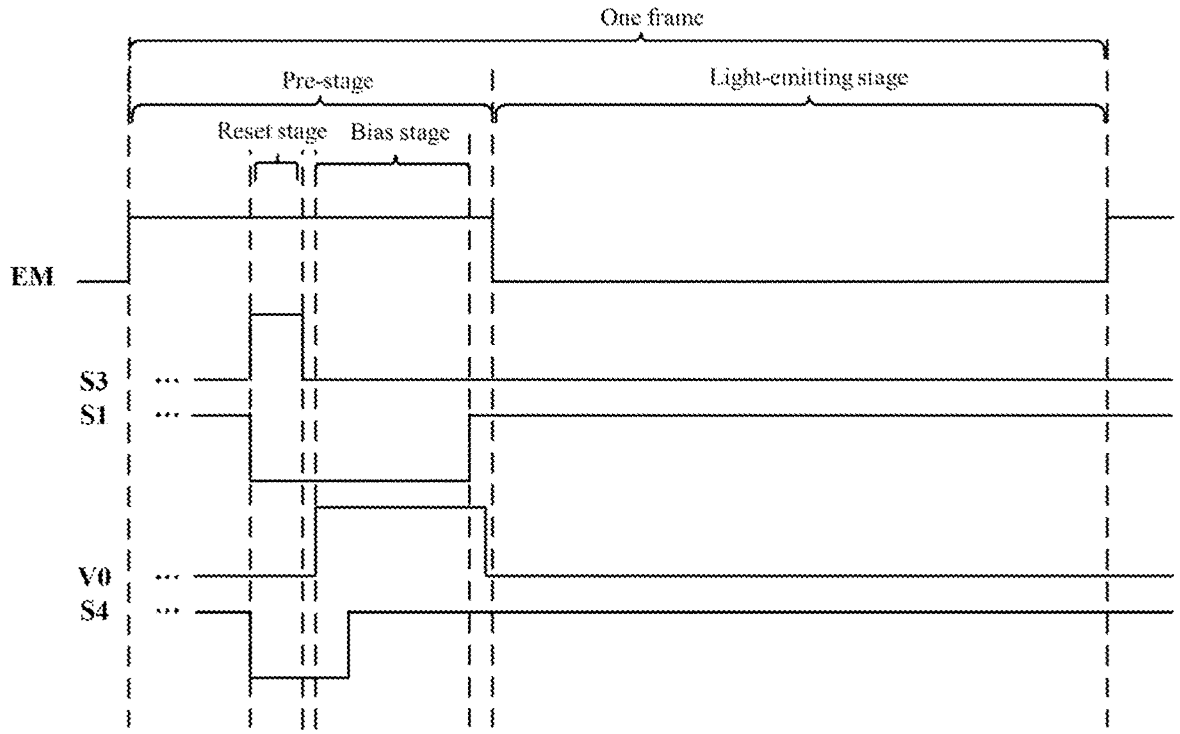
FIG. 3 illustrates an operating timing diagram of a pixel circuit in FIG. 1 consistent with disclosed embodiments of the present disclosure.
Figure 4:
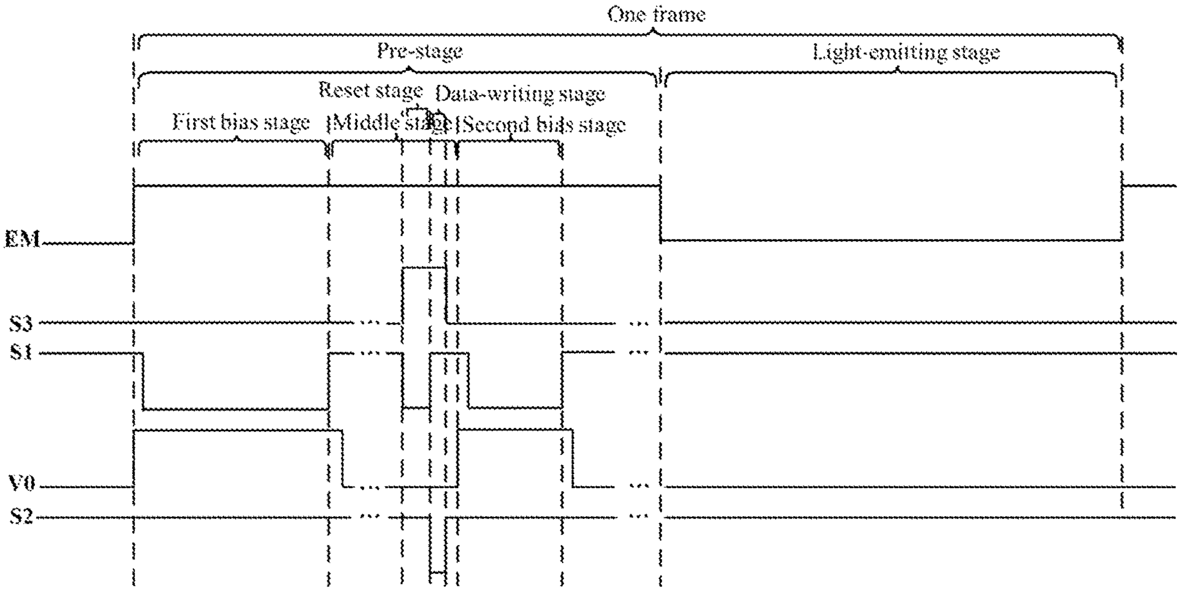
FIG. 4 illustrates another operating timing diagram of a pixel circuit in FIG. 1 consistent with disclosed embodiments of the present disclosure.
Figure 5:
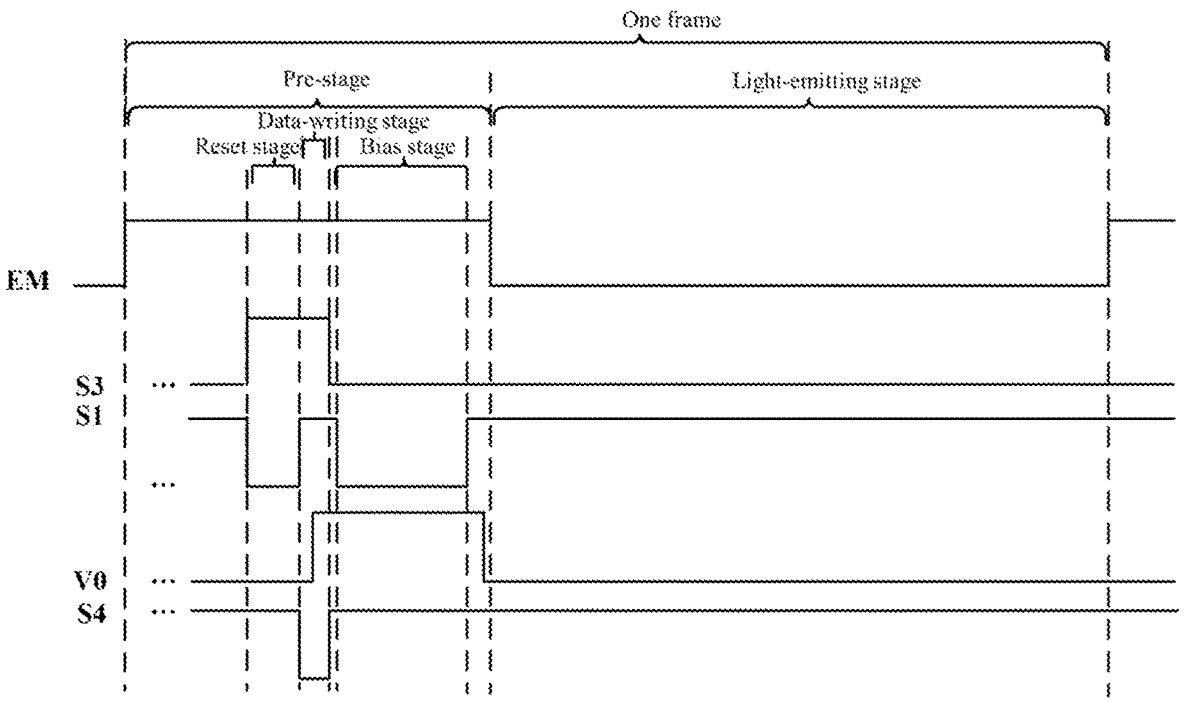
FIG. 5 illustrates another operating timing diagram of a pixel circuit in FIG. 1 consistent with disclosed embodiments of the present disclosure.

FIG. 3 illustrates an operating timing diagram of the pixel circuit in FIG. 1; FIG. 4 illustrates another operating timing diagram of pixel circuit in FIG. 1; and FIG. 5 illustrates another operating timing diagram of the pixel circuit in FIG. 1. Further, within a duration of displaying one frame of the display panel, the operating process of the pixel circuit may include a pre-light-emitting stage and a light-emitting stage. Within a duration of displaying at least one frame, the pre-light-emitting stage of the pixel circuit may include a bias stage. For the convenience of description, in the present disclosure, the signal received by the reset signal terminal may refer to V0.

Referring to FIG. 3, the pre-light-emitting stage may further include a reset stage. After the reset stage ends, the pixel circuit may enter the bias stage. At the beginning of the bias stage, the gate potential of the driving transistor T0 may be the reset signal Vref. In view of this, at the beginning of the bias stage, the gate potential of the driving transistor T0 may have been reset. If the driving transistor T0 is a PMOS transistor, the gate potential may be reset to a low-level signal. Then, in the bias stage, the drain of the driving transistor T0 may receive the high-level bias signal Vobs, to achieve the dual adjustments of the gate potential and the drain potential. If the driving transistor T0 is an NMOS transistor, the gate potential may be reset to a high-level signal. Then, in the bias stage, the drain of the driving transistor T0 may receive the low-level bias signal Vobs, to achieve the dual adjustments of the gate potential and the drain potential.

In certain embodiments, before the bias stage starts, the gate potential of the driving transistor T0 may not be equal to the reset signal Vref.

Referring to FIG. 4, after the light-emitting stage ends and the pre-light-emitting stage starts, the reset module 15 may be turned on, the compensation module 14 may be kept off, and the pixel circuit may enter the bias stage. In view of this, after the light-emitting stage ends and the pre-light-emitting stage starts, the pixel circuit may enter the bias stage without entering the reset stage, and the gate potential of the driving transistor T0 may not be equal to the reset signal Vref. For a PMOS transistor, the reset signal may be a low-level signal. When the gate potential of the driving transistor T0 is not equal to the reset signal, the gate potential may be greater than the reset signal. Then, after entering the bias stage, the gate potential may rise. Therefore, it may be difficult to reduce the potential difference between the gate potential and the drain potential, or to reverse the difference potential between the gate potential and the drain potential. In view of this, after the latch module 16 is set, because the first transistor T1 is also a PMOS transistor, in the bias stage, the first transistor T1 may be turned on and the first scanning signal S1 may be a low-level signal. Under the action of the first scanning signal S1 and the latch module 16, the gate potential of the driving transistor may be pulled down, such that while adjusting the drain potential of the driving transistor in the bias stage, the gate potential thereof may also be adjusted, thereby achieving the dual adjustments and facilitating to improve the bias effect.

Referring to FIGS. 4-5, the pre-light-emitting stage may also include a data-writing stage. In the data-writing stage, the data-writing module 12, the driving module 11, and the compensation module 14 may be turned on, and the data signal Vdata may be written into the gate of the driving transistor T0. At least one bias stage of the pre-light-emitting stage may be performed after performing the data-writing stage. In the data-writing stage, the data signal Vdata may be written into the gate of the driving transistor T0, which may cause a substantially high gate potential of the driving transistor T0. Then, after entering the bias stage, because the gate potential is substantially high, it may be difficult to reduce the potential difference between the gate potential and the drain potential, or to reverse the potential difference between the gate potential and the drain potential.

In view of this, after the latch module 16 is set, because the first transistor T1 is a PMOS transistor, in the bias stage, the first transistor T1 may be turned on, and the first scanning signal S1 may be a low-level signal. Under the action of the latch module 16 and the first scanning signal S1, the gate potential of the driving transistor may be pulled down, such that while adjusting the drain potential of the driving transistor in the bias stage, the gate potential may also be adjusted, thereby achieving the dual adjustments and facilitating to improve the bias effect.

Referring to FIG. 4, the pre-light-emitting stage may further include N bias stages, where N≥1. For illustrative purposes, FIG. 4 illustrates two bias stages as an example. The pre-light-emitting stage may further include one, three, or more than three bias stages, which may not be limited by the present disclosure. In FIG. 4, the pre-light-emitting stage may include a first bias stage and a second bias stage. The first bias stage may be performed before the data-writing stage, and the second bias stage may be performed after the data-writing stage. A duration of the first bias stage may be greater than a duration of the second bias stage. Further, the first bias stage may be configured as a main bias stage, and the second bias stage may be configured as an auxiliary bias stage. The first bias stage may be mainly configured to cancel out the deviation of the threshold voltage in the non-bias stage. To prevent the insufficient bias effect of the first bias stage, any other auxiliary bias stage may be configured to fully supplement the bias effect.

Optionally, in one embodiment, referring to FIG. 1, the latch module 16 may include a first capacitor C1. A first electrode plate of the first capacitor C1 may be connected to the gate of the driving transistor T0, and a second electrode plate thereof may be connected to the first scanning signal line. Because the capacitor is capable of charging and discharging, the capacitor may be used as a latch module to regulate the potential of one node by another node. Further, the capacitor may not need a separate control terminal, which may simplify the structure and process of the pixel circuit.

Optionally, the pixel circuit may further include a second capacitor C2. An electrode plate of the second capacitor C2 may be connected to the gate of the driving transistor T0 for storing the data signal transmitted to the gate of the driving transistor T0. Referring to FIG. 1, one electrode plate of the second capacitor C2 may be connected to the gate of the driving transistor T0, and the other electrode plate may be connected to a first power signal terminal for storing the data signal Vdata. Referring to FIG. 2, one electrode plate of the second capacitor C2 may be connected to the gate of the driving transistor T0, and the other electrode plate may be connected to the light-emitting element 20 for storing the data signal.

Optionally, in one embodiment, a capacitance value of the first capacitor C1 may be smaller than a capacitance value of the second capacitor C2. Because the second capacitor C2 is configured to store the data signal Vdata written into the gate of the driving transistor T0, while the data signal Vdata written into the gate of the driving transistor T0 is one of the main factors that determine the driving current generated in the driving transistor T0 during the light-emitting stage, the signal of the driving transistor T0 may be fully stored in the data-writing stage through the capacitor with substantially strong storage capacity. The bias stage may be configured to adjust the potential difference between the gate potential and drain potential of the driving transistor T0, from the perspective of accurate data storage, the storage capacity of the second capacitor may need to be greater than the storage capacity of the first capacitor. Therefore, the capacitance value of the first capacitor C1 may be configured to be smaller than the capacitance value of the second capacitor C2.

Optionally, the capacitance value of the first capacitor C1 and the capacitance value of the second capacitor C2 may satisfy a relationship: $C2\times\frac{1}{8}\leq C1\leq C2\times\frac{1}{4}$. When $C2\times\frac{1}{8}\leq C1\leq C2\times\frac{1}{4}$, the capacitance value of the first capacitor C1 may meet the demands of the bias stage, and further, the capacitance value of the first capacitor C1 may be prevented from being too large. Therefore, the load of the pixel circuit may not increase, and the signal transmission of the first scanning signal line may not be affected.

Figure 6:
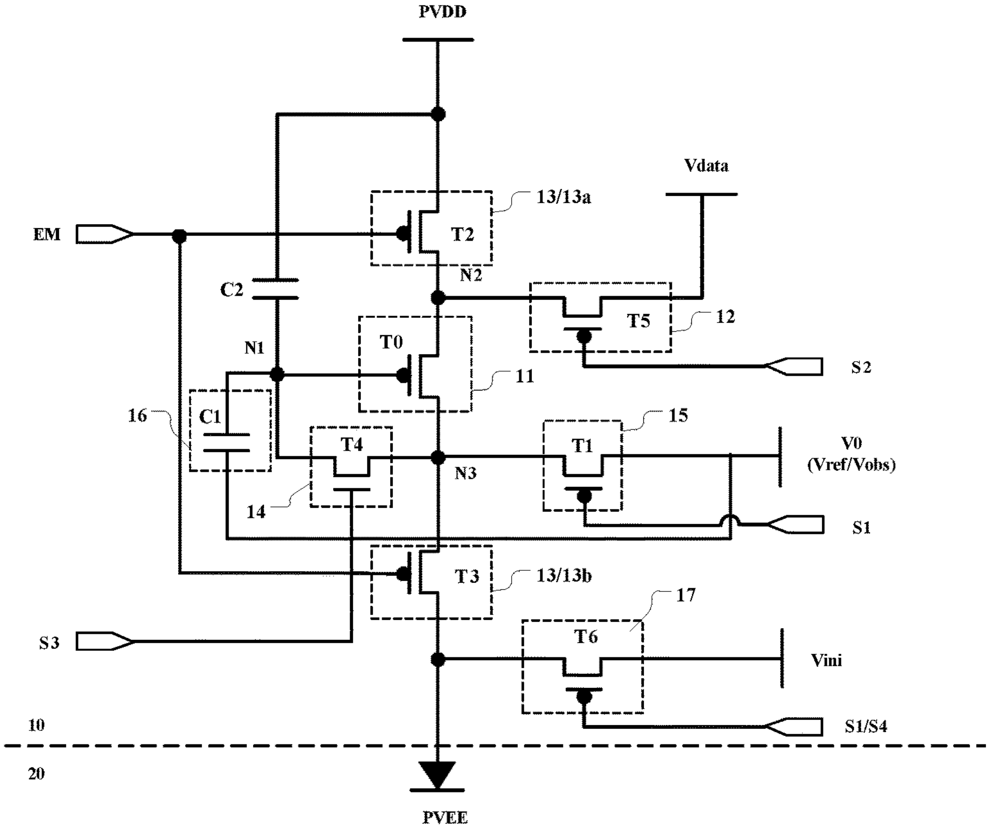
FIG. 6 illustrates a schematic diagram of a pixel circuit of another exemplary display panel consistent with disclosed embodiments of the present disclosure.

FIG. 6 illustrates a schematic diagram of a pixel circuit of another display panel consistent with disclosed embodiments of the present disclosure. Referring to FIG. 6, the display panel may include a pixel circuit 10 and a light-emitting element 20. The pixel circuit 10 may include a driving module 11, a data-writing module 12, a light-emitting controller 13, a compensation module 14 and a reset module 15. The driving module 11 may be configured to provide a driving current for the light-emitting element 20, and the driving module 11 may include a driving transistor T0. The data-writing module 12 may be configured to selectively provide a data signal Vdata for the driving transistor T0. The light-emitting controller 13 may be configured to selectively allow the light-emitting element 20 to enter a light-emitting stage. One end of the light-emitting controller 13 may be connected to a first power signal terminal for receiving a first power signal PVDD. The compensation module 14 may be connected between the gate and the drain of the driving transistor T0 for compensating a threshold voltage of the driving transistor T0. The reset module 15 may be connected between the reset signal terminal and the drain of the driving transistor T0 for providing a reset signal for the gate of the driving transistor T0.

Further, the reset module 15 may be multiplexed as a bias module. The operating process of the pixel circuit may include a reset stage and a bias stage. In the reset stage, the compensation module 14 and the reset module 15 may be turned on, and the reset signal terminal may provide a reset signal Vref for the gate of the driving transistor T0. In the bias stage, the compensation module 14 may be turned off and the reset module 15 may be turned on, and the reset signal terminal may provide a bias signal Vobs for the drain of the driving transistor T0.

The pixel circuit may further include a latch module 16 and a reset signal line. The reset signal line may be configured to provide a reset signal Vref or a bias signal Vobs for the reset signal terminal. The latch module 16 may be connected between the gate of the driving transistor T0 and the reset signal line.

Optionally, in one embodiment, an input terminal of the driving module 11 may be connected to a source of the driving transistor T0, and an output terminal of the driving module 11 may be connected to the drain of the driving transistor T0. Optionally, in the pixel circuit illustrated in FIG. 1, the driving transistor T0 may be a PMOS transistor. Further, the driving transistor T0 may be a low-temperature polysilicon transistor.

Optionally, in one embodiment, a control terminal of the data-writing module 12 may be connected to a second scanning signal line for receiving a second scanning signal S2. The second scanning signal S2 may control the turn-on and turn-off of the data-writing module 12. A first end of the data-writing module 12 may be connected to a data signal input terminal for receiving the data signal Vdata, and a second end of the data-writing module 12 may be connected to the input terminal of the driving module 11. Optionally, the data-writing module 12 may include a fifth transistor T5. A source of the fifth transistor T5 may be connected to the first end of the data-writing module 12, and the drain of the fifth transistor T5 may be connected to the second end of the data-writing module 12.

Optionally, in one embodiment, the light-emitting controller 13 may include a first light-emitting controller 13*a* and a second light-emitting controller 13*b*. A first end of the first light-emitting controller 13*a* may be connected to the first power signal terminal for receiving the first power signal PVDD, and a second end of the first light-emitting controller 13*a* may be connected to an input terminal of the driving module 11. A first end of the second light-emitting controller 13*b* may be connected to an output terminal of the driving module 11, and a second end thereof may be connected to the light-emitting element 20. The control terminals of the first light-emitting controller 13*a* and the second light-emitting controller 13*b* may be connected to a same light-emitting control signal line for receiving the light-emitting control signal EM, as shown in FIG. 1. In certain embodiments, the control terminals of the first light-emitting controller 13*a* and the second light-emitting controller 13*b* may be connected to different light-emitting control signal lines for receiving different light-emitting control signals.

Optionally, the first light-emitting controller 13*a* may include a second transistor T2. A source of the second transistor T2 may be connected to the first end of the first light-emitting controller 13*a*, and a drain thereof may be connected to the second end of the first light-emitting controller 13*a*. The second light-emitting controller 13*b* may include a third transistor T3. A source of the third transistor T3 may be connected to the first end of the second light-emitting controller 13*b*, and a drain thereof may be connected to the second end of the second light-emitting controller 13*b*.

Optionally, in one embodiment, the pixel circuit 10 may include the reset module 15 and the compensation module 14. The reset module 15 may be connected between the reset signal terminal and the drain of the driving transistor T0 for providing a reset signal for the gate of the driving transistor T0. The reset module may include a first transistor T1. The compensation module 14 may be connected between the gate and the drain of the driving transistor T0 for compensating a threshold voltage of the driving transistor T0. The pixel circuit 10 may further include an initialization module 17. The initialization module 17 may be connected between an initialization signal terminal and the light-emitting element 20 for selectively providing an initialization signal Vini for the light-emitting element 20.

Optionally, the source of the first transistor T1 may be connected to the reset signal terminal, and the drain thereof may be connected to the drain of the driving transistor T0.

Optionally, the control terminal of the compensation module 14 may be connected to a third scanning signal line for receiving the third scanning signal S3. The third scanning signal S3 may control the turn-on and turn-off of the compensation module 14. The compensation module 14 may include a fourth transistor T4. The source of the fourth transistor T4 may be connected to the drain of the driving transistor T0, and the drain thereof may be connected to the gate of the driving transistor T0.

Optionally, the fourth transistor T4 may be a PMOS transistor or an NMOS transistor. When the fourth transistor T4 is a PMOS transistor and the third scanning signal S3 is a low-level signal, the fourth transistor T4 may be turned on, and the fourth transistor T4 may be a low-temperature polysilicon transistor. When the fourth transistor T4 is an NMOS transistor and the third scanning signal S3 is a high-level signal, the fourth transistor T4 may be turned on, and the fourth transistor T4 may be an oxide semiconductor transistor. For illustrative purposes, the fourth transistor T4 may be an NMOS oxide semiconductor transistor as an example.

Optionally, the initialization module may include a sixth transistor T6. The source of the sixth transistor T6 may be connected to the initialization signal terminal, and the drain thereof may be connected to the light-emitting element 20.

In one embodiment, the gate of the driving transistor may be connected to the reset signal line through the latch module. Because the reset signal line provides a reset signal or a bias signal for the reset signal terminal, due to the difference in function and effect, the reset signal and the bias signal may have a different voltage, thereby causing a voltage jump when the signal at the reset signal terminal is switched between the reset signal and the bias signal. In one embodiment, such voltage jump may be used to maintain the gate potential of the driving transistor when the gate potential of the driving transistor changes.

Optionally, in one embodiment, the driving transistor T0 may be a PMOS transistor, and the voltage value of the bias signal Vobs may be greater than the voltage value of the reset signal Vref. In another embodiment, the driving transistor T0 may be an NMOS transistor, and the voltage value of the bias signal Vobs may be less than the voltage value of the reset signal Vref. When the display panel is in a non-bias stage such as the light-emitting stage, the source of the driving transistor T0 may receive the first power signal PVDD, and the gate of the driving transistor T0 may be a signal written in the data-writing stage. Therefore, when the driving transistor is a PMOS transistor, in the light-emitting stage, the gate potential of the driving transistor T0 may be likely greater than the drain potential thereof, the driving transistor may be turned on, and such situation may be maintained for a long time, which may cause the Id-Vg curve of the driving transistor T0 to be deviated, and, thus, may cause an offset of the threshold voltage of the driving transistor T0.

Therefore, to improve such situation, the bias stage may need to be added. In the bias stage, the potential difference between the gate potential and the drain potential of the driving transistor T0 may be adjusted to reduce the offset of the threshold voltage of the driving transistor T0 caused by above-mentioned problems in the non-bias stage, ensuring the display uniformity.

To resolve the above problem, for a PMOS transistor, the drain potential of the driving transistor T0 may need to be appropriately pulled up during the bias stage. Therefore, the bias signal Vobs may be a substantially high-level signal, and the reset signal Vref may be configured to reset the gate of the driving transistor T0. For a PMOS transistor, the reset signal Vref may often be a substantially low-level signal. For an NMOS transistor, the drain potential of the driving transistor T0 may need to be appropriately decreased during the bias stage. Therefore, the bias signal Vobs may be a substantially low-level signal, and the reset signal Vref may be configured to reset the gate of the driving transistor T0. For an NMOS transistor, the reset signal Vref may often be a substantially high-level signal.

Figure 7:
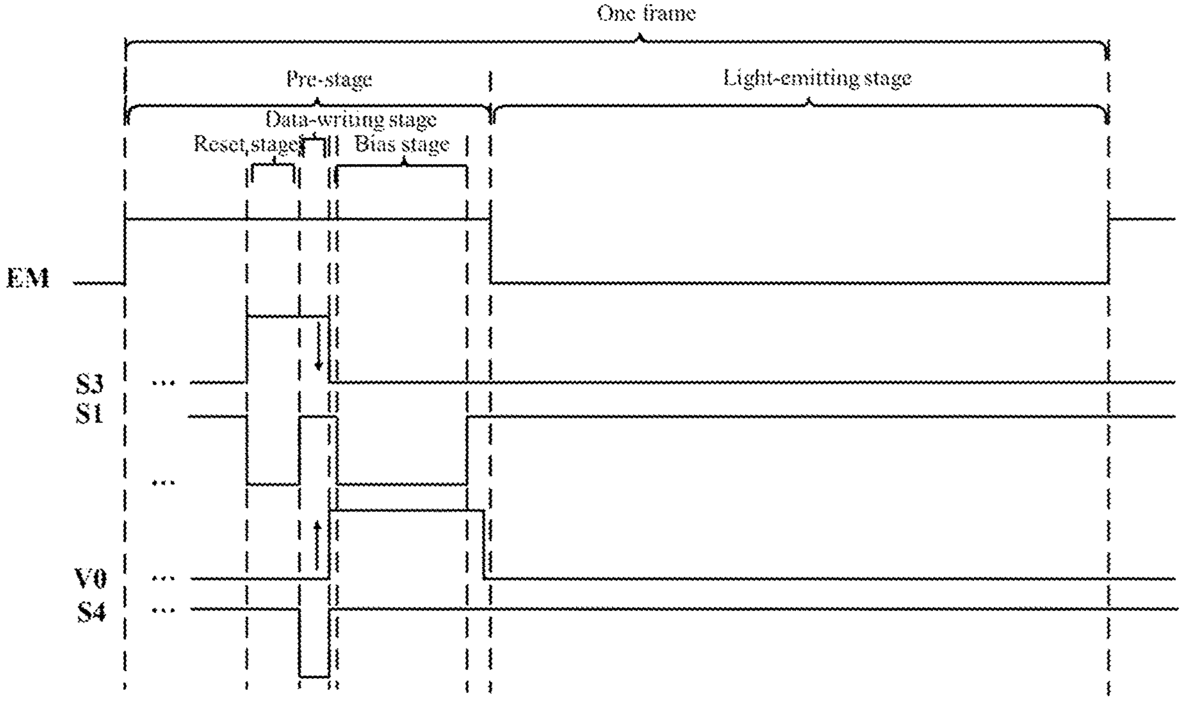
FIG. 7 illustrates an operating timing diagram of a pixel circuit in FIG. 6 consistent with disclosed embodiments of the present disclosure.
Figure 8:
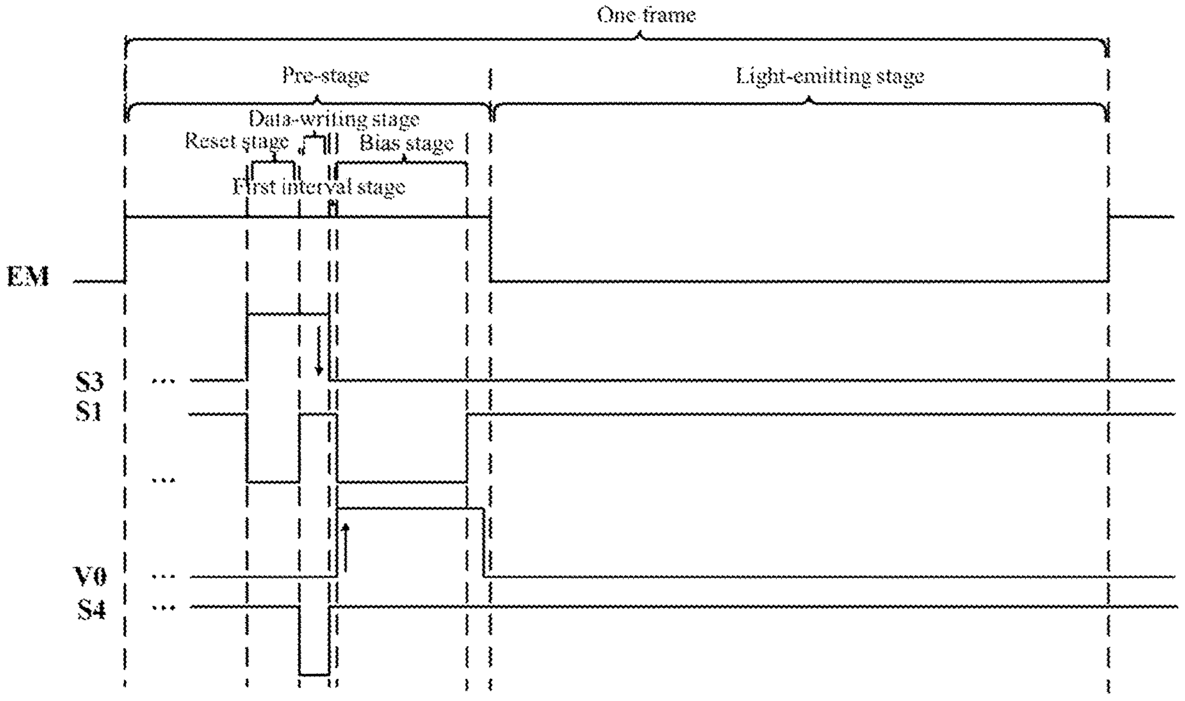
FIG. 8 illustrates another operating timing diagram of a pixel circuit in FIG. 6 consistent with disclosed embodiments of the present disclosure.

FIG. 7 illustrates an operating timing diagram of the pixel circuit in FIG. 6; and FIG. 8 illustrates another operating timing diagram of the pixel circuit in FIG. 6. Referring to FIG. 7, the operating process of the pixel circuit 10 may include a data-writing stage. In the data-writing stage, the data-writing module 12, the driving module 11, and the compensation module 14 may be turned on, the data-writing module 12, the driving module 11, and the compensation module 14 may be turned on, and the data signal Vdata may be written into the gate of the driving transistor T0. Further, after the data-writing stage ends, while turning off the compensation module 14, the signal V0 at the reset signal terminal may be changed from the reset signal Vref to the bias signal Vobs. Alternatively, referring to FIG. 8, after the data-writing stage ends, the compensation module 14 may be turned off, and after a first interval stage, the signal V0 at the reset signal terminal may be changed from the reset signal Vref to the bias signal Vobs.

In the data-writing stage, the data signal Vdata may be written into the gate of the driving transistor T0. When the data-writing stage ends, the compensation module 14 may be turned off. In other words, the third scanning signal S3 may have a falling edge, and such process may cause the gate potential of the driving transistor T0 having the data signal just written thereon to be unstable, and the gate potential may be likely pulled down. In one embodiment, the latch module 16 may be set between the gate of the driving transistor T0 and the reset signal line. The signal V0 at the reset signal terminal may have a rising edge while the falling edge of the third scanning signal S3 arrives or after the first interval stage, which may raise the gate potential of the driving transistor T0 to cancel out the problem caused by the falling edge of the third scanning signal S3. Therefore, the gate potential of the driving transistor T0 after writing the data signal Vdata may be maintained to ensure that the driving current is stable in subsequent light-emitting stage.

Optionally, a duration of the first interval stage may be less than a duration of the data-writing stage. Because the voltage jump of the signal V0 at the reset signal terminal cancels out the problem of unstable gate potential of the driving transistor T0 caused by the falling edge of the third scanning signal S3, if the duration of the first interval stage is too long, the jump of the signal V0 may not effectively cancel out the problem of unstable gate potential of the driving transistor T0. In the data-writing stage, the data signal Vdata may need to be continuously written into the gate of the driving transistor T0, which may require a certain duration, therefore, the duration of the first interval stage may be less than the duration of the data-writing stage.

Optionally, in one embodiment, referring to FIG. 8, when the signal V0 at the reset signal terminal is changed from the reset signal Vref to the bias signal Vobs, the first scanning signal S1 may have a falling edge, the reset module 15 may be turned on, and the pixel circuit 10 may enter the bias stage. Alternatively, referring to FIG. 7, after the signal V0 at the reset signal terminal changes from the reset signal Vref to the bias signal Vobs, after a second interval stage, the first scanning signal S1 may have a falling edge, and the reset module 15 may be turned on. The signal may jump at the same time, which may shorten the duration of the pre-light-emitting stage of the operating process of the pixel circuit, and may facilitate to achieve high-frequency display. The signal may jump after the second interval stage, which may provide a certain buffer duration for the driving transistor, and may facilitate to improve the stability of the driving transistor. Optionally, the duration of the second interval stage may be less than the duration of the bias stage. Because the second interval stage may be merely used for transition, therefore, the second interval stage may not need a long duration, while the bias stage may need a certain duration to achieve the bias effect.

Referring to FIG. 7 and FIG. 8, within a duration of displaying one frame of the display panel, the operating process of the pixel circuit may include a pre-light-emitting stage and a light-emitting stage. With a duration of displaying at least one frame, the pre-light-emitting stage of the pixel circuit may include a bias stage.

At least one bias stage of the pre-light-emitting stage may be performed after the data-writing stage. Because the jump of the signal V0 at the reset signal terminal may be mainly configured to cancel out the change of the falling edge of the third scanning signal S3 after the data-writing stage, after the signal V0 at the reset signal terminal jumps from the low-level reset signal Vref to the high-level bias signal Vobs, the first scanning signal S1 may control the reset module 15 to be turned on, and the pixel circuit may enter the bias stage.

Figure 9:
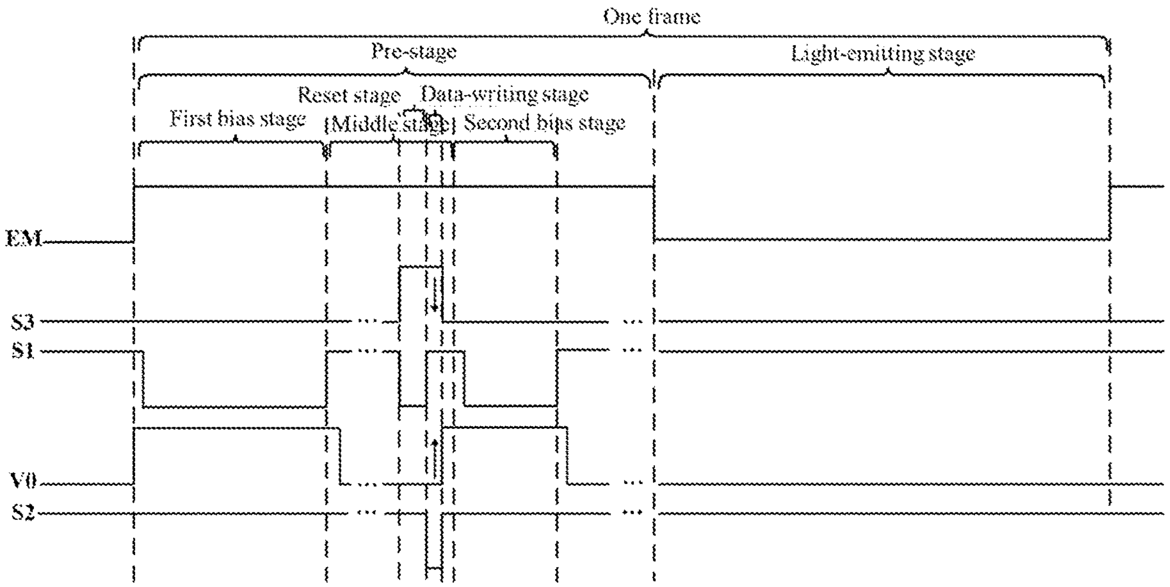
FIG. 9 illustrates another operating timing diagram of a pixel circuit in FIG. 6 consistent with disclosed embodiments of the present disclosure.

FIG. 9 illustrates an operating timing diagram of another pixel circuit in FIG. 6. Referring to FIG. 9, the pre-light-emitting stage may include N bias stages, where N≥1. For illustrative purposes, FIG. 9 illustrates two bias stages as an example. The pre-light-emitting stage may further include one, three, or more than three bias stages, which may not be limited by the present disclosure. In FIG. 9, the pre-light-emitting stage may include a first bias stage and a second bias stage. The first bias stage may be performed before the data-writing stage, and the second bias stage may be performed after the data-writing stage. A duration of the first bias stage may be greater than a duration of the second bias stage. Further, the first bias stage may be a main bias stage, and the second bias stage may be used as an auxiliary bias stage. The first bias stage may be mainly configured to cancel out the deviation of the threshold voltage in the non-bias stage. To prevent the insufficient bias effect of the first bias stage, any other auxiliary bias stage may be configured to fully supplement the bias effect.

Optionally, in one embodiment, the latch module 16 may include a first capacitor C1. A first electrode plate of the first capacitor C1 may be connected to the gate of the driving transistor T0, and a second electrode plate thereof may be connected to the reset signal line. Because the capacitor is capable of charging and discharging, the capacitor may be configured as a latch module to regulate the potential of one node by another node. Further, the capacitor may not need a separate control terminal, which may simplify the structure and process of the pixel circuit.

Optionally, the pixel circuit may further include a second capacitor C2. An electrode plate of the second capacitor C2 may be connected to the gate of the driving transistor T0 for storing the data signal transmitted to the gate of the driving transistor T0. Referring to FIG. 6, one electrode plate of the second capacitor C2 may be connected to the gate of the driving transistor T0, and the other electrode plate thereof may be connected to a first power signal terminal for storing the data signal.

Optionally, in one embodiment, a capacitance value of the first capacitor C1 may be smaller than a capacitance value of the second capacitor C2. Because the second capacitor C2 is configured to store the data signal Vdata written into the gate of the driving transistor T0, while the data signal Vdata written into the gate of the driving transistor T0 is one of the main factors that determine the driving current generated in the driving transistor T0 during the light-emitting stage, the signal of the driving transistor T0 may be fully stored in the data-writing stage through the capacitor with substantially strong storage capacity. The first capacitor C1 may be mainly configured to stabilize the gate potential of the driving transistor T0. From the perspective of accurate data storage, the storage capacity of the second capacitor C2 may need to be greater than the storage capacity of the first capacitor C1. Therefore, in the present disclosure, the capacitance value of the first capacitor C1 may be configured to be smaller than the capacitance value of the second capacitor C2.

Optionally, the capacitance value of the first capacitor C1 and the capacitance value of the second capacitor C2 may satisfy a relationship: $C2\times 1/8 \leqslant C1 \leqslant C2\times 1/4$. When $C2\times 1/8 \leqslant C1 \leqslant C2\times 1/4$, the capacitance value of the first capacitor C1 may meet the demands of the bias stage, and further, the capacitance value of the first capacitor C1 may be prevented from being too large. Therefore, the load of the pixel circuit may not increase, and the signal transmission of the first scanning signal line may not be affected.

In the present disclosure, the latch module may be provided in the pixel circuit, which may be configured to improve the effect of the bias stage or to stabilize the gate potential of the driving transistor. The bias stage and the related operating process of the pixel circuit may be described in detail below.

Optionally, referring to FIGS. 1-9, in one embodiment, the operating process of the pixel circuit 10 may further include at least one non-bias stage. In the bias stage, a gate voltage of the driving transistor T0 may be Vg1, a source voltage thereof may be Vs1, and a drain voltage thereof may be Vd1. In the non-bias stage, the gate voltage of the driving transistor may be Vg2, the source voltage thereof may be Vs2, and the drain voltage thereof may be Vd2.

In certain embodiments, $|Vg1-Vd1|<|Vg2-Vd2|$. Through configuring $|Vg1-Vd1|<|Vg2-Vd2|$, the difference between the gate voltage and the drain voltage of the driving transistor T0 in the bias stage may be smaller than the difference between the gate voltage and the drain voltage of the driving transistor T0 in the non-bias stage, which may facilitate to alleviate the offset phenomenon of the threshold voltage of the driving transistor T0.

In certain embodiments, $(Vg1-Vd1)\times(Vg2-Vd2)<0$. Through configuring $(Vg1-Vd1)\times(Vg2-Vd2)<0$, the original potential difference between the gate potential and the drain potential of the driving transistor T0 in the non-bias stage may be reversed in the bias stage, to effectively balance the offset phenomenon of the threshold voltage of the driving transistor T0 caused in the non-bias stage.

Further, optionally, $(Vd1-Vg1)>(Vg2-Vd2)>0$. Through configuring $(Vd1-Vg1)>(Vg2-Vd2)>0$ and configuring a substantially large (Vd1−Vg1) difference, the potential difference between the gate potential and the drain potential of the driving transistor T0 in the non-bias stage may be balanced by another larger reversal potential difference in the bias stage, which may facilitate to shorten the duration of the bias stage.

In addition, optionally, if the duration of the bias stage is t1 and the duration of the non-bias stage is t2, $(|Vg1-Vd1|-|Vg2-Vd2|)\times(t1-t2)<0$. When $|Vg1-Vd1|>|Vg2-Vd2|$, in other words, when the reversal potential difference in the bias stage is greater than the potential difference in the non-bias stage, the duration of the bias stage may be smaller than the duration of the non-bias stage. On the contrary, if $|Vg1-Vd1|<|Vg2-Vd2|$, in other words, when the reversal potential difference in the bias stage is smaller than the potential difference in the non-bias stage, the duration of the bias stage may be greater than the duration of the non-bias stage. Therefore, in the bias stage, the offset problem of the threshold voltage of the driving transistor generated in the non-bias stage may be fully cancelled out, and at the same time, other problems caused by excessively performing the bias stage may be avoided.

Optionally, the non-bias stage may be the light-emitting stage of the display panel. Because the driving transistor T0 may provide the driving current for the light-emitting element 20 in the light-emitting stage. In the pixel circuit shown in FIG. 1, before the light-emitting element 20 enters the light-emitting stage, the data signal Vdata may be first written into the gate of the driving transistor T0 until the gate potential of the driving transistor T0 becomes (Vdata-Vth), and then the light-emitting element may enter the light-emitting stage. Therefore, in the light-emitting stage, the gate potential of the driving transistor T0 may be a substantially high-level potential. In certain embodiments, in the light-emitting stage, the source potential of the driving transistor T0 may be approximately 4.6V, the gate potential thereof may be 3V, and the drain potential thereof may be 1V. Therefore, in the light-emitting stage, the driving transistor T0 may be turned on, while the gate potential may be greater than the drain potential, which may cause the Id-Vg curve to be deviated and may cause an offset of the threshold voltage Vth of the driving transistor T0. Therefore, in the present disclosure, the light-emitting stage may be configured as a non-bias stage to solve the above technical problems caused by the light-emitting stage.

Optionally, referring to FIG. 3, the duration of displaying one frame may include the pre-light-emitting stage and the light-emitting stage. The pre-light-emitting stage may include the reset stage and the bias stage in sequence. In the reset stage, the first scanning signal S1 may control the reset module 15 to be turned on. The first transistor T1 in the reset module 15 may be a PMOS transistor or an NMOS transistor. The NMOS transistor may be an oxide semiconductor transistor. For illustrative purposes, the first transistor in FIG. 1 may be a PMOS transistor as an example. The third scanning signal S3 may control the compensation module 14 to be turned on. The fourth transistor T4 in the compensation module 14 may be a PMOS transistor or an NMOS transistor. The NMOS transistor may be an oxide semiconductor transistor. For illustrative purposes, the fourth transistor in FIG. 1 may be an NMOS transistor as an example. The reset signal terminal may provide a reset signal Vref for the gate of the driving transistor T0 through the reset module 15 and the compensation module 14, and at this time, V0 may be Vref, which may be a substantially low-level signal.

At the end of the reset stage, the compensation module 14 may be turned off. Optionally, while turning off the compensation module 14, in other words, at the falling edge of the third scanning signal S3, the signal V0 at the reset signal terminal may be pulled up from the low-level signal Vref to a substantially high high-level signal Vobs. In view of this, the reset module 15 may be kept on, the pixel circuit may enter the bias stage, and the reset signal terminal may provide a bias signal Vobs for the drain of the driving transistor T0. Through configuring to perform the bias stage while ending the reset stage, the duration of the pre-light-emitting stage may be reduced.

In addition, optionally, referring to FIG. 3, at the end of the reset stage, the compensation module 14 may be first turned off, and the signal V0 at the reset signal terminal may be pulled up from the low-level signal Vref to the substantially high high-level signal Vobs after a certain interval, the reset module 15 may be kept on, and the pixel circuit 10 may enter the bias stage. In view of this, an interval stage may be set between the reset stage and the bias stage to avoid the instability of the driving transistor caused by simultaneous conversion of multiple signals. The driving transistor may be stabilized after the interval stage, and then the next operation may be performed to improve stability of the pixel circuit. Optionally, the duration of the interval stage may be smaller than the duration of the reset stage, or the duration of the interval stage may be smaller than the duration of the bias stage. Because the interval stage is merely configured to stabilize the driving transistor, and may not need to have a long duration.

Optionally, referring to FIG. 4, after the reset stage ends, the reset module 15 may be turned on, and the compensation module 14 may be kept on for a certain interval stage. After the certain interval stage, the compensation module 14 may be turned off, and at the same time or afterwards, the reset module 15 may be turned on again. Further, at the same time or before, the signal V0 at the reset signal terminal may be pulled up from the low-level signal Vref to the substantially high high-level signal Vobs, and the pixel circuit may enter the bias stage. In such process, each signal may change at the same time, which may facilitate to shorten the duration of the pre-light-emitting stage. Alternatively, each signal may change after an interval stage, which may facilitate to stabilize the driving transistor. The specific design may be flexibly set according to practical applications.

Optionally, referring to FIG. 4, after the reset stage ends, the duration between a stage where the reset module 15 is turned off and a stage where the compensation module 14 is turned off may include the data-writing stage. After the reset stage ends, the second scanning signal S2 may control the data-writing module 12 to be turned on, and the data signal Vdata may be written into the gate of the driving transistor T0 through the turned-on data-writing module 12, the driving module 11 and the compensation module 14. After the data-writing stage ends, the compensation module 14 may be turned off, the reset module 15 may be turned on again, and the pixel circuit may enter the bias stage.

Optionally, in one embodiment, the duration of the aforementioned reset stage may be less than the duration of the bias stage. Because the reset stage is configured to write the reset signal into the gate of the driving transistor, the reset stage may not need to have a large duration. The bias stage may be configured to cancel out the offset of the threshold voltage in the non-bias stage, and, thus, the bias stage may need a certain duration to achieve the bias effect.

In addition, referring to FIG. 4, the duration of the data-writing stage may be less than the duration of the bias stage. Because the data-writing stage is configured to write the data signal into the gate of the driving transistor, the data-writing stage may not need to have a large duration. The bias stage may be configured to cancel out the offset of the threshold voltage in the non-bias stage, and, thus, the bias stage may need a certain duration to achieve the bias effect.

In the foregoing embodiment, the reset stage may be set before the bias stage. The gate potential of the driving transistor T0 may be first reset to a substantially low low-level signal through the reset signal Vref, and then the drain potential of the driving transistor T0 may be pulled up to a substantially high high-level signal through the bias signal Vobs. Therefore, in the bias stage, on the one hand, the gate potential of the driving transistor T0 may be pulled down, and on the other hand, the drain potential of the driving transistor T0 may be pulled up. The drain potential and the gate potential may be adjusted respectively, which may facilitate to improve the potential difference between the gate potential and drain potential of the driving transistor T0, to enhance the effect of the bias stage, and to fully cancel out the offset of the threshold voltage of the driving transistor T0 in the non-bias stage.

Optionally, in one embodiment, referring to FIG. 5, the pre-light-emitting stage may include N bias stages, where $N \geq 1$. A middle stage may be configured between any two adjacent bias stages in the N bias stages. The reset stage in the aforementioned embodiments may be set before the first bias stage at the beginning of the bias stage. In other words, the gate of the driving transistor T0 may be first reset, and then the bias stage may start. In addition, optionally, the reset stage may be set in the middle stage between any two adjacent bias stages, e.g., a middle stage between the first bias stage and the second bias stage, or a middle stage between the second bias stage and the third bias stage, etc. In other words, when the pre-light-emitting stage starts, at least one bias stage may be first performed, and then the reset stage may be performed. In addition, optionally, the reset stage may also be set after the last bias stage of the pre-light-emitting stage, i.e., before the light-emitting stage. In view of this, the data-writing stage may be performed after the reset stage, and then the light-emitting stage may be performed. In the aforementioned embodiments, the data-writing stage may be performed after the reset stage, or the bias stage may be directly performed without performing the data-writing stage, which may be determined according to practical applications.

For illustrative purposes, FIG. 5 illustrates two bias stages as an example, which may not be limited by the present disclosure. Optionally, referring to FIG. 5, in the pre-light-emitting stage, the duration between any two bias stages may not be equal. For example, the duration of the first bias stage may be greater than the duration of any other bias stage. It may be understood that the first bias stage may be the main bias stage, and may be mainly configured to cancel out the offset of the threshold voltage in the non-bias stage. To prevent the insufficient bias effect of the first bias stage, any other auxiliary bias stage may be set to fully supplement the bias effect.

On such basis, in the pre-light-emitting stage, the durations of the bias stages may sequentially decrease, such that the subsequent bias stage may be configured to supplement the insufficient bias effect of the previous bias stage. Based on a same concept, the bias stages may be reversely set. For example, the duration of the last bias stage may be greater than the duration of any other bias stage. Specifically, in the pre-light-emitting stage, the durations of the bias stages may sequentially increase. The bias effect may be gradually achieved through the bias stages with gradually increasing duration one-by-one.

In addition, based on the aforementioned concept, a duration of certain one bias stage in the middle may be greater than the duration of the first bias stage, and may be greater than the duration the second bias stage. In other words, the bias stage in the middle may be the main bias stage, and the closing bias stage may be configured as a supplement.

Optionally, in one embodiment, one data-writing cycle of the display panel may include S frames of a refreshed picture, which may include a data-writing frame and a holding frame, where S>0. The data-writing frame may include the data-writing stage. In the data-writing stage, the data-writing module may write the data signal into the gate of the driving transistor. The holding frame may not include the data-writing stage.

In an implementation method of the present disclosure, the pre-light-emitting stage of at least one data-writing frame may include the bias stage. In view of this, referring to FIG. 4, the data-writing stage may be performed before the bias stage, may be performed after the bias stage, or may be performed between two adjacent bias stages. When the data-writing stage is performed before the bias stage, the compensation module 14 may be turned off in the bias stage, and the data signal Vdata may be latched on the gate of the driving transistor T0.

Optionally, in one embodiment, the duration of the pre-light-emitting stage may be T11, and the sum of durations of the entire bias stages in the pre-light-emitting stage may be T22. When T22≤⅔×T11, the bias stage may be prevented from occupying too long duration of the pre-phase, the duration of the bias stage may not increase, and the refresh frequency of the display panel may be prevented from being reduced to affect the display effect.

In another implementation method, the pre-light-emitting stage of at least one holding frame may include a bias stage. In view of this, the pre-light-emitting stage may include a bias stage and may not include a data-writing stage. Optionally, the pre-light-emitting stage may include a reset stage, as shown in FIG. 3. Alternatively, the pre-light-emitting stage may not include the reset stage, and the bias stage may be directly processed. In view of this, if the duration of the pre-light-emitting stage is T11 and the sum of durations of entire bias stages in the pre-light-emitting stage is T22, T22 may be equal to T11. In other words, the entire pre-light-emitting stage may be the bias stage. In another embodiment, T22≥⅔×T11, the duration of the pre-light-emitting stage may be fully used to perform the bias stage, which may prevent the pre-light-emitting stage from being too long, and may achieve a desired bias effect.

In one embodiment, merely the pre-light-emitting stage of the data-writing frame may include the bias stage, while the pre-light-emitting stage of the holding frame may not include the bias stage. In view of this, the bias problem may be resolved by merely using the data-writing frame, and the bias stage may not need to be set in the holding frame. In another embodiment, only the pre-light-emitting stage of the holding frame may include the bias stage, and the pre-light-emitting stage of the data-writing frame may not include the bias stage. Because the data-writing frame may include the reset stage and the data-writing stage, if the holding frame is capable of fully achieving the work of the bias stage, the bias stage may not need to be set in the data-writing frame, which may simplify the timing sequence of the data-writing frame.

In another implementation method, the pre-light-emitting stage of at least one holding frame and the pre-light-emitting stage of at least one data-writing frame may include a bias stage. Therefore, the holding frame and the data-writing frame may jointly perform the work of the bias stage, to ensure the effect of the bias stage. Optionally, the duration of the bias stage in the holding frame may be greater than the duration of at least one bias stage in the data-writing frame. The pre-phase of the holding frame may not include the data-writing stage, and the timing sequence may be substantially simple, which may enable the duration of the bias stage in the holding frame to be substantially long, and may enable the duration of at least one bias stage in the data-writing frame to be substantially short, thereby preventing the duration of the pre-phase of the data-writing frame from being too long. On such basis, the sum of durations of the bias stages in the holding frame may be greater than or equal to the sum of durations of the bias stages in the data-writing frame. Further, optionally, the duration of the bias stage in the holding frame may be greater than the duration of any bias stage in the data-writing frame, to sufficiently prevent the duration of the pre-phase of the data-writing frame from being excessive long.

In addition, in one embodiment, as shown in FIG. 3 and the foregoing description, the duration of turning on the initialization module 17, i.e., the initialization stage of the pixel circuit, may not overlap with the bias stage, or may partially overlap with the bias stage. The initialization stage may end at the same time as the bias stage, or the initialization stage may end before or after the bias stage, which may be determined according to practical applications.

In addition, in one embodiment, the display panel may further include an integrated chip. The integrated chip may be configured to provide required driving signal, e.g., a data signal Vdata, a reset signal Vref, a bias signal Vobs, etc., for the pixel circuit. Based on a same concept, the integrated chip in the present disclosure may provide the reset signal Vref for the reset signal terminal in the reset stage of the pixel circuit, and may provide the bias signal Vobs for the reset signal terminal in the bias stage of the pixel circuit, to ensure the operating process of the pixel circuit in the present disclosure. The specific information of the reset signal Vref and the bias signal Vobs may refer to related description in the foregoing embodiments.

In the present disclosure, one or more of the T0, T1, T2, T3, T4, T5, and T6 may be PMOS transistors with polysilicon as the active layer, and the other may be NMOS transistors with oxide semiconductor as the active layer. For example, T4 may be an NMOS transistor, and other transistors may be PMOS transistors. Alternatively, T0 and T1 may be a same type of transistors, e.g., both T0 and T1 may be PMOS transistors or NMOS transistors, and at least one of the other transistors may be another type of transistor, e.g., an NMOS transistor, or a PMOS transistor. The effective pulse signal of the scanning signal of the NMOS transistor may be a high-level signal, and the effective pulse signal of the scanning signal of the PMOS transistor may be a low-level signal. The pixel circuits shown in FIGS. 1-9 are merely examples, which may not be limited by the present disclosure.

Optionally, an aspect ratio of the channel region of the NMOS transistor may be greater than an aspect ratio of the channel region of the PMOS transistor. In the present disclosure, if the NMOS transistor mainly serves as a switching transistor, the NMOS transistor may need rapid response capability. The transistor with a large aspect ratio may have a substantially short channel region, which may facilitate to improve the response capability of the transistor.

In addition, the four scanning signals of S1, S2, S3, and S4 may be different signals. In certain embodiments, if the timing sequence meets a certain condition, at least two of the four signals of S1, S2, S3, and S4 may be the same signal. For example, when T5 and T6 are the same type of transistors, in other words, when both T5 and T6 are PMOS transistors or NMOS transistors, S1 and S4 may be the same signal. For another example, when T4 and T6 are the same type of transistors, in other words, when both T4 and T6 are PMOS transistors or NMOS transistors, S3 and S4 may be the same signal, which may be determined according to specific circuit structure and timing sequence.

Figure 10:
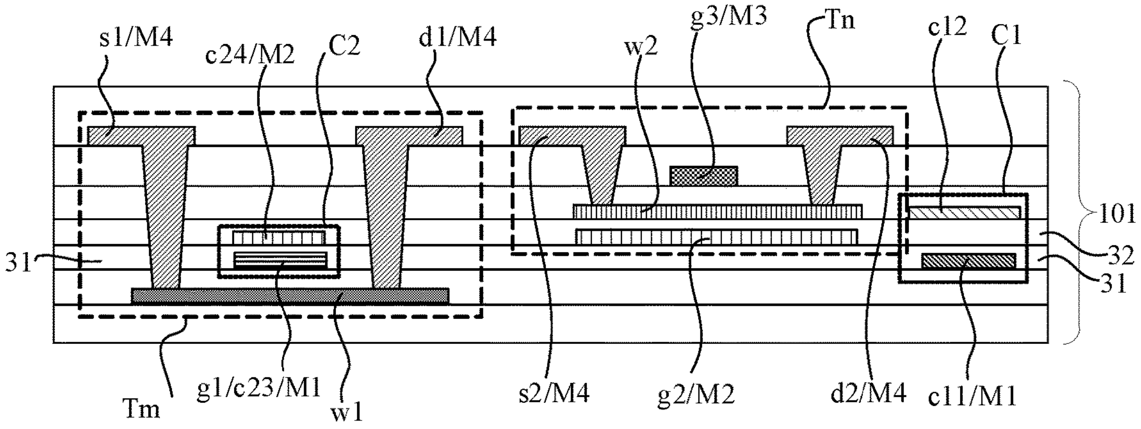
FIG. 10 illustrates a schematic local cross-sectional view of an exemplary pixel circuit consistent with disclosed embodiments of the present disclosure.

FIG. 10 illustrates a schematic local cross-sectional view of a pixel circuit. Referring to FIG. 10, the pixel circuit may include two types of transistors: a transistor Tm and a transistor Tn. The gate of the transistor Tm may be formed on a first metal layer M1, and both source and drain thereof may be formed on the fourth metal layer M4. The transistor Tm may include a first active layer w1 located between the first metal layer M1 and the base substrate. The transistor Tn may include a first gate and a second gate. The first gate may be located on the second metal layer M2, and the second gate may be located on the third metal layer M3. The transistor Tn may include a second active layer w2 located between the second metal layer M2 and the third metal layer M3, and the source and drain of the transistor Tn may be located on the fourth metal layer M4. Further, the transistor Tm may be a low temperature polysilicon transistor, and the transistor Tn may be an oxide semiconductor transistor.

The pixel circuit may include a first capacitor C1 and a second capacitor C2. The first capacitor C1 may include a first electrode plate C11 and a second electrode plate C12, and the second capacitor C2 may include a third electrode plate C23 and a fourth electrode plate C24. The first electrode plate and the second electrode plate may be located on any two metal layers of the first active layer w1, the first metal layer M1, the second metal layer M2, the second active layer w2, the third metal layer M3, and the fourth metal layer M4. The third electrode plate and the fourth electrode plate may be located on any two layers of the first active layer w1, the first metal layer M1, the second metal layer M2, the second active layer w2, the third metal layer M3, and the fourth metal layer M4.

In certain embodiments, the first electrode plate and the third electrode plate may be located on a same layer, and the second electrode plate and the fourth electrode plate may be located on a same layer. In view of this, an area of the first electrode plate may be smaller than an area of the third electrode plate, and an area of the second electrode plate may be smaller than an area of the fourth electrode plate, such that the capacitance value of the first capacitor C1 may be smaller than the capacitance value of the second capacitor C2.

In certain embodiments, the first electrode plate and the third electrode plate may be on the same layer, and the second electrode plate and the fourth electrode plate may be on different layers. Optionally, a distance between the first electrode plate and the second electrode plate may be greater than a distance between the third electrode plate and the fourth electrode plate, such that the capacitance value of the first capacitor C1 may be smaller than the capacitance value of the second capacitor C2. In view of this, optionally, the first electrode plate and the third electrode plate may be located on the first metal layer M1, the fourth electrode plate may be located on the second metal layer M2, and the second electrode plate may be located on one of the second active layer w2, the third metal layer M3, and the fourth metal layer M4.

In certain embodiments, the first electrode plate, the second electrode plate, the third electrode plate, and the fourth electrode plate may be located on different film layers, and each may be located on any one of the first active layer w1, the first metal layer M1, the second metal layer M2, the second active layer w2, the third metal layer M3, and the fourth metal layer M4.

Optionally, a first insulating layer may be disposed between the first electrode plate and the second electrode plate, and a second insulating layer may be disposed between the third electrode plate and the fourth electrode plate. The dielectric constant of the first insulating layer may be smaller than the dielectric constant of the second insulating layer, such that the capacitance value of the first capacitor C1 may be smaller than the capacitance value of the second capacitor C2. In addition, optionally, when the driving transistor is a PMOS transistor, the transistor Tm may be a driving transistor. In view of this, the hydrogen content of the second insulating layer may be greater than the hydrogen content of the first insulating layer.

In one embodiment, the second capacitor C2 may be the storage capacitor in the pixel circuit, and in the direction perpendicular to the surface of the display panel, the second capacitor C2 may often overlap the driving transistor. The driving transistor may have a top-gate structure, and, thus, the second capacitor C2 may often be located on a side of the first active layer w1 away from the base substrate. In particular, the third electrode plate C23 of the second capacitor C2 may be multiplexed as a gate of the transistor Tm. The fourth electrode plate may be located on the second metal layer M2 and may overlap the gate of the transistor Tm. In view of this, the driving transistor may be a PMOS transistor, and optionally, may be a low-temperature polysilicon transistor. The active layer of the low-temperature polysilicon transistor may need to be hydrogenated, which may cause a substantially high hydrogen content in the surrounding film. Therefore, in one embodiment, the hydrogen content of the second insulating layer may be greater than the hydrogen content of the first insulating layer.

Optionally, the oxygen content in the first insulating layer may be greater than the oxygen content in the second insulating layer. Because the capacitance value of the first capacitor C1 is smaller than the capacitance value of the second capacitor C2, in certain embodiments, the thickness of the first insulating layer may be greater than the thickness of the second insulating layer. Therefore, compared with the third electrode plate and the fourth electrode plate, at least one of the first electrode plate and the second electrode plate of the first capacitor C1 may be closer to the active layer of the transistor Tn, i.e., the active layer of the oxide semiconductor transistor. To ensure the normal function of the oxide semiconductor transistor, the film layer surrounding the active layer of the oxide semiconductor transistor may have a substantially small hydrogen content and a substantially large oxygen content. Therefore, in view of this, the oxygen content in the first insulating layer may be greater than the oxygen content in the second insulating layer.

Based on a same concept, the present disclosure also provides a driving method of a display panel. The display panel may include a pixel circuit 10 and a light-emitting element 20. The pixel circuit 10 may include a driving module 11, a data-writing module 12, a compensation module 14, and a reset module 15. The driving module 11 may be configured to provide a driving current for the light-emitting element 20, and the driving module 11 may include a driving transistor T0. The data-writing module 12 may be connected between a data signal input terminal and the source of the driving transistor T0, and may be configured to provide a data signal Vdata for the driving module 11. The compensation module 14 may be connected between the gate and the drain of the driving transistor T0 for compensating a threshold voltage of the driving transistor T0. The reset module 15 may be connected between the reset signal terminal and the drain of the driving transistor T0 for providing a reset signal Vref for the gate of the driving transistor T0. The reset module may include a bias module.

The driving method of the display panel may include a reset stage and a bias stage. In the reset stage, the reset module 15 and the compensation module 14 may be turned on, and the reset signal terminal may provide a reset signal for the gate of the driving transistor T0 to reset the gate of the driving transistor T0. In the bias stage, the reset module 15 may be turned on and the compensation module 14 may be turned off, and the reset signal terminal may provide a bias signal Vobs for the drain of the driving transistor T0 to adjust the bias state of the driving transistor T0.

In certain embodiments, the driving method may include a driving method used in the operating process of the pixel circuit in any of the foregoing embodiments. The same or similar parts may not be repeated herein.

Based on a same concept, the present disclosure also provides a display device. The display device may include a display panel in any of the above-disclosed embodiments. Optionally, the display panel may be an organic light-emitting display panel or a micro LED display panel.

Figure 11:
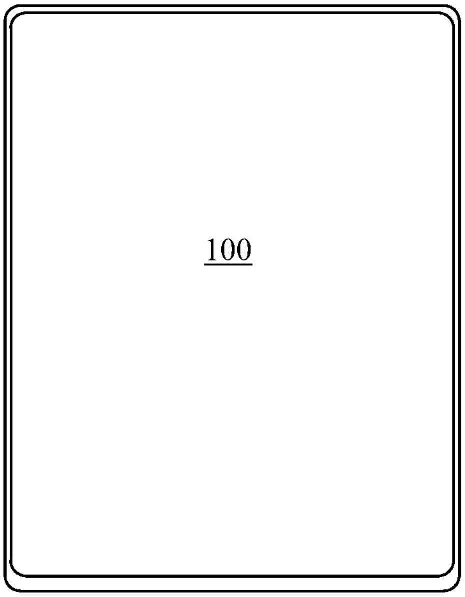
FIG. 11 illustrates a schematic diagram of an exemplary display device consistent with disclosed embodiments of the present disclosure.

FIG. 11 illustrates a schematic diagram of a display device consistent with disclosed embodiments of the present disclosure. Referring to FIG. 11, the display device may be applied to an electronic device 100 such as a smart phone, a tablet computer, etc. It can be understood that the above-mentioned embodiments may merely provide some examples of the pixel circuit structure and the driving method of the pixel circuit. The display panel may also include any other structure, which may not be repeated herein.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display panel, comprising:

a pixel circuit and a light-emitting element, wherein:

the pixel circuit includes a driving module, a data-writing module, and a compensation module, and a reset module;

the driving module includes a driving transistor;

the data-writing module is connected to a source of the driving transistor and configured to selectively provide a data signal for the driving transistor;

the compensation module is connected between a gate and a drain of the driving transistor;

the reset module is connected between the drain of the driving transistor and a reset signal terminal and configured to provide a reset signal for the gate of the driving transistor;

the reset module is used as a bias module, an operating process of the pixel circuit includes a reset stage and a bias stage;

in the reset stage, the compensation module and the reset module are turned on, and the reset signal terminal provides the reset signal to the gate of the driving transistor;

in the bias stage, the compensation module is turned off, the reset module is turned on, and the reset signal terminal provided a bias signal to the drain of the driving transistor;

the pixel circuit further includes a latch module and a reset signal line, the reset signal line being configured to provide the reset signal or the bias signal for the reset signal terminal, and the latch module being connected between the gate of the driving transistor and the reset signal line;

in time of one frame of the display panel, the operating process of the pixel circuit includes a pre-light-emitting stage and a light-emitting stage, the pre-light-emitting stage including the bias stage in time of at least one frame;

the pre-light-emitting stage includes a first bias stage and a second bias stage;

the first bias stage is performed before the data-writing stage, and the second bias stage is performed after the data-writing stage; and a time length of the first bias stage is longer than a time length of the second bias stage.

2. The display panel according to claim 1, wherein the pixel circuit further includes:

a light-emitting controller configured to selectively allow the light-emitting element to enter a light-emitting stage, an end of the light-emitting controller being connected to a first power signal terminal and configured to receive a first power signal.

3. The display panel according to claim 1, wherein:

the driving transistor is a PMOS transistor, and a voltage of the bias signal is higher than a voltage of the reset signal; or the driving transistor is a NMOS transistor, and the voltage of the bias signal is lower than the voltage of the reset signal.

4. The display panel according to claim 1, wherein:

the operating process of the pixel circuit further includes a data-writing stage, in the data-writing stage, the data writing module, the driving module, the compensation module being turned on, and the data signal being written into the gate of the driving transistor, wherein in response to an end of the data-writing stage:

the compensation module is turned off, and simultaneously, a signal of the reset signal terminal is converted from the reset signal to the bias signal; or the compensation module is turned off, and after a first interval stage, the signal of the reset signal terminal is converted from the reset signal to the bias signal.

5. The display panel according to claim 4, wherein:

a time length of the first interval stage is shorter than a time length of the data-writing stage.

6. The display panel according to claim 4, wherein:

in response to the end of the data-writing stage, the compensation module being turned off, and the signal of the reset signal terminal being converted from the reset signal to the bias signal, the signal of the reset signal terminal is used to maintains a gate potential of the driving transistor through the latch module.

7. The display panel according to claim 4, wherein:

the signal of the reset signal terminal is converted from the reset signal to the bias signal, and simultaneously, the reset module is turned on, and the pixel circuit enters the bias stage; or after the signal of the reset signal terminal is converted from the reset signal to the bias signal, the reset module is turned on after a second interval stage.

8. The display panel according to claim 1, wherein:

at least one bias stage of the pre-light-emitting stage is performed after the data-writing stage.

9. The display panel according to claim 1, wherein:

the latch module includes a first capacitor, a first electrode plate of the first capacitor being connected to the gate of the driving transistor, and a second electrode plate of the first capacitor being connected to the reset signal line.

10. The display panel according to claim 9, wherein the pixel circuit further includes:

a light-emitting controller configured to selectively allow the light-emitting element to enter a light-emitting stage, an end of the light-emitting controller being connected to a first power signal terminal and configured to receive a first power signal; and a second capacitor connected between the first power signal terminal and the gate of the driving transistor and configured to store the data signal transmitted to the gate of the driving transistor, wherein a capacitance value of the first capacitor is less than a capacitance value of the second capacitor.

11. The display panel according to claim 10, wherein:

a capacitance value of the first capacitor is C1, and a capacitance value of the second capacitor is C2, $C2\times\frac{1}{8}\leq C1\leq C2\times\frac{1}{4}$.

12. A display device comprising a display panel, including:

a pixel circuit and a light-emitting element, wherein:

the pixel circuit includes a driving module, a data-writing module, and a compensation module, and a reset module;

the driving module includes a driving transistor;

the data-writing module is connected to a source of the driving transistor and configured to selectively provide a data signal for the driving transistor;

the compensation module is connected between a gate and a drain of the driving transistor;

the reset module is connected between the drain of the driving transistor and a reset signal terminal and configured to provide a reset signal for the gate of the driving transistor;

the reset module is used as a bias module, an operating process of the pixel circuit includes a reset stage and a bias stage;

in the reset stage, the compensation module and the reset module are turned on, and the reset signal terminal provides the reset signal to the gate of the driving transistor;

in the bias stage, the compensation module is turned off, the reset module is turned on, and the reset signal terminal provided a bias signal to the drain of the driving transistor;

the pixel circuit further includes a latch module and a reset signal line, the reset signal line being configured to provide the reset signal or the bias signal for the reset signal terminal, and the latch module being connected between the gate of the driving transistor and the reset signal line;

in time of one frame of the display panel, the operating process of the pixel circuit includes a pre-light-emitting stage and a light-emitting stage, the pre-light-emitting stage including the bias stage in time of at least one frame;

the pre-light-emitting stage includes a first bias stage and a second bias stage;

the first bias stage is performed before the data-writing stage, and the second bias stage is performed after the data-writing stage; and a time length of the first bias stage is longer than a time length of the second bias stage.

13. A display panel, comprising:

a pixel circuit and a light-emitting element, wherein:

the pixel circuit includes a driving module, a data-writing module, and a compensation module, and a reset module;

the driving module includes a driving transistor;

the data-writing module is connected to a source of the driving transistor and configured to selectively provide a data signal for the driving transistor;

the compensation module is connected between a gate and a drain of the driving transistor;

the reset module is connected between the drain of the driving transistor and a reset signal terminal and configured to provide a reset signal for the gate of the driving transistor;

the reset module is used as a bias module, an operating process of the pixel circuit includes a reset stage and a bias stage;

in the reset stage, the compensation module and the reset module are turned on, and the reset signal terminal provides the reset signal to the gate of the driving transistor;

in the bias stage, the compensation module is turned off, the reset module is turned on, and the reset signal terminal provided a bias signal to the drain of the driving transistor;

the pixel circuit further includes a latch module and a reset signal line, the reset signal line being configured to provide the reset signal or the bias signal for the reset signal terminal, and the latch module being connected between the gate of the driving transistor and the reset signal line, wherein the latch module includes a first capacitor, a first electrode plate of the first capacitor being connected to the gate of the driving transistor, and a second electrode plate of the first capacitor being connected to the reset signal line; and the pixel circuit additionally includes:

a light-emitting controller configured to selectively allow the light-emitting element to enter a light-emitting stage, an end of the light-emitting controller being connected to a first power signal terminal and configured to receive a first power signal; and a second capacitor connected between the first power signal terminal and the gate of the driving transistor and configured to store the data signal transmitted to the gate of the driving transistor, wherein a capacitance value of the first capacitor is less than a capacitance value of the second capacitor, wherein a capacitance value of the first capacitor is C1, and a capacitance value of the second capacitor is C2, $C2\times\frac{1}{8}\leq C1\leq C2\times\frac{1}{4}$.

* * * * *